(12) United States Patent
Kim et al.

(10) Patent No.: US 12,246,984 B2
(45) Date of Patent: *Mar. 11, 2025

(54) GLASS COATING COMPOSITION, MANUFACTURING METHOD FOR COATED GLASS USING THE GLASS COATING COMPOSITION, AND COOKING APPARATUS USING THE COATED GLASS

(71) Applicants: LG ELECTRONICS INC., Seoul (KR); KONGJU NATIONAL UNIVERSITY INDUSTRY-UNIVERSITY COOPERATION FOUNDATION, Chungcheongnam-do (KR)

(72) Inventors: Taehee Kim, Seoul (KR); Taeho Kim, Seoul (KR); Yongsoo Lee, Seoul (KR); Woon Jin Chung, Chungcheongnam-do (KR); Hansol Lee, Chungcheongnam-do (KR); In Gun Kim, Chungcheongnam-do (KR)

(73) Assignees: LG ELECTRONICS INC., Seoul (KR); KONGJU NATIONAL UNIVERSITY INDUSTRY-UNIVERSITY COOPERATION FOUNDATION, Chungcheongnam-Do (KR)

( * ) Notice: Subject to any disclaimer, the term of this patent is extended or adjusted under 35 U.S.C. 154(b) by 875 days.

This patent is subject to a terminal disclaimer.

(21) Appl. No.: 17/156,852

(22) Filed: Jan. 25, 2021

(65) Prior Publication Data
US 2021/0230053 A1   Jul. 29, 2021

(30) Foreign Application Priority Data

Jan. 23, 2020   (KR) ........................ 10-2020-0009092

(51) Int. Cl.
| | | |
|---|---|---|
| C03C 17/00 | (2006.01) | |
| A21B 3/02 | (2006.01) | |
| C03C 3/17 | (2006.01) | |
| C03C 3/21 | (2006.01) | |
| C03C 8/08 | (2006.01) | |
| C03C 8/20 | (2006.01) | |
| C03C 17/02 | (2006.01) | |
| B82Y 40/00 | (2011.01) | |

(52) U.S. Cl.
CPC .............. *C03C 17/008* (2013.01); *A21B 3/02* (2013.01); *C03C 3/17* (2013.01); *C03C 3/21* (2013.01); *C03C 8/08* (2013.01); *C03C 8/20* (2013.01); *C03C 17/02* (2013.01); *B82Y 40/00* (2013.01); *C03C 2217/216* (2013.01); *C03C 2217/29* (2013.01); *C03C 2217/452* (2013.01); *C03C 2217/475* (2013.01); *C03C 2217/476* (2013.01); *C03C 2217/477* (2013.01)

(58) Field of Classification Search
CPC .... C03C 3/17; C03C 3/19; C03C 3/21; C03C 8/08; C03C 8/20; C03C 14/004; C03C 17/02; C03C 17/04
See application file for complete search history.

(56) References Cited

U.S. PATENT DOCUMENTS

| | | |
|---|---|---|
| 2005/0084718 A1 | 4/2005 | Tomonaga et al. |
| 2007/0292695 A1 | 12/2007 | Kodaira et al. |
| 2008/0020134 A1 | 1/2008 | Tomonaga et al. |
| 2013/0299483 A1 | 11/2013 | Kim et al. |
| 2018/0022930 A1 | 1/2018 | Koyo et al. |
| 2018/0045419 A1 | 2/2018 | Kim |
| 2018/0170797 A1 | 6/2018 | Gorecki et al. |
| 2018/0215655 A1 | 8/2018 | Kim et al. |
| 2019/0071347 A1 | 3/2019 | Kim et al. |
| 2019/0263716 A1 | 8/2019 | Kim et al. |
| 2021/0032158 A1* | 2/2021 | Kim .......................... C03C 8/20 |

FOREIGN PATENT DOCUMENTS

| | | |
|---|---|---|
| CN | 105686955 | 6/2016 |
| EP | 3 050 857 | 8/2016 |
| EP | 3 357 876 | 8/2018 |
| EP | 3 771 697 | 2/2021 |
| KR | 10-2011-0023079 | 3/2011 |
| KR | 10-2013-0125907 | 11/2013 |
| KR | 10-2013-0125918 | 11/2013 |
| KR | 10-2019-0071660 | 6/2019 |
| KR | 10-2019-0103664 | 9/2019 |
| KR | 10-2019-0120965 | 10/2019 |
| WO | WO 2003/004580 | 1/2003 |
| WO | WO 2014/053249 | 4/2014 |

OTHER PUBLICATIONS

European Search Report issued in Application No. 21152769.2 dated Jun. 18, 2021.
Shkurakova E. A. et al.; "Phase Composition and Structure of Aluminum-Coating Composite"; Glass and Ceramics, Springer, New York, NY, US; vol. 61, Nos. 5-6, May 1, 2004, pp. 203-205; XP001220731.
Internation Search Report issued in Application No. PCT/KR2020/010076 on Nov. 24, 2020.

* cited by examiner

*Primary Examiner* — Elizabeth A. Bolden
(74) *Attorney, Agent, or Firm* — KED & ASSOCIATES

(57) ABSTRACT

A glass coating composition may include a glass composition and a nanopowder. The nanopowder may include Zinc Oxide (ZnO) and may be added to a glass composition in 1 to 10 weight (wt %). The glass composition may include 20 to 40 wt % of phosphorus pentoxide ($P_2O_5$), a total of 15 to 30 wt % of aluminum oxide ($Al_2O_3$) and zirconium dioxide ($ZrO_2$), a total of 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

9 Claims, 5 Drawing Sheets

FIG. 3

| Category | Transmittance | HAZE (%) | T.T (Total Transmittance) | P.T (Parallel Transmittance) | D.T (Diffuse Transmittance) |
|---|---|---|---|---|---|
| Comparative Example 1 | 91.0% | 0.81 | 91.29 | 90.55 | 0.74 |
| Comparative Example 2 | 71.9% | 21.30 | 82.01 | 64.63 | 17.38 |
| Embodiment 1 | 50.4% | 41.26 | 74.78 | 43.93 | 30.85 |
| Embodiment 2 | 75.3% | 21.84 | 82.21 | 64.27 | 17.95 |
| Embodiment 3 | 68.3% | 24.50 | 83.12 | 62.75 | 20.36 |

FIG. 4

| Category | Transmittance | HAZE (%) | T.T (Total Transmittance) | P.T (Parallel Transmittance) | D.T (Diffuse Transmittance) |
|---|---|---|---|---|---|
| Embodiment 4 | 80.1% | 16.18 | 85.96 | 72.05 | 13.91 |
| Embodiment 5 | 85.2% | 4.14 | 89.72 | 86.01 | 3.71 |
| Embodiment 6 | 67.8% | 36.36 | 80.68 | 51.34 | 29.34 |
| Embodiment 7 | 72.8% | 45.15 | 79.85 | 43.80 | 36.05 |

GLASS COATING COMPOSITION, MANUFACTURING METHOD FOR COATED GLASS USING THE GLASS COATING COMPOSITION, AND COOKING APPARATUS USING THE COATED GLASS

CROSS-REFERENCE TO RELATED APPLICATION(S)

This application claims priority to and the benefit of Korean Patent Application No. 10-2020-0009092, filed in Korea on Jan. 23, 2020, the disclosure of which is incorporated herein by reference in its entirety.

BACKGROUND

1. Field

Disclosed herein are a glass coating composition, a manufacturing method for coated glass using the glass coating composition, and a cooking apparatus using the coated glass.

2. Background

Cooking apparatuses, such as electric ovens and gas ovens, are used to cook food or other items (hereinafter, collectively "food") using a heat source. Contaminants produced during cooking may dirty an interior of the cooking apparatus (e.g., an inner surface of a cavity or door), so the cooking apparatus will need to be cleaned. A coating layer may be formed on the inner wall or surface of the cavity and/or the door to facilitate removal of such contaminants.

The door of the cooking apparatus may be provided with a door glass or glass window allowing a user to look inside the cooking apparatus. Contaminants may also be attached to the door glass. A coating layer may be formed on an inner surface of the door glass to facilitate cleaning thereof. However, a coating layer of the related art has a low light transmittance, and users may not be able to clearly view the interior of the cooking apparatus (e.g., during a cooking process to assess doneness). Thus, there is a growing need for a coating composition that has a higher light transmittance and/or allows users to more clearly view the interior of cooking apparatus.

In addition, the coating layer of the related art may require cleaning at high temperatures and/or by soaking. However, such conditions may not be readily applied to the door glass. Thus, there is a growing need for a coating composition that facilitates cleaning without high temperatures or soaking. Further, there is a growing need for a manufacturing method to readily form a coating layer onto a glass substrate, such as a door glass or window of a cooking apparatus.

BRIEF DESCRIPTION OF THE DRAWINGS

Embodiments will be described in detail with reference to the following drawings in which like reference numerals refer to like elements wherein:

FIG. 3 shows values of physical properties of coated glass manufactured according to embodiments 1 to 3 and comparative examples 1 to 2;

FIG. 4 shows values of physical properties of coated glass manufactured according to embodiments 4 to 7;

DETAILED DESCRIPTION

Figure 1:
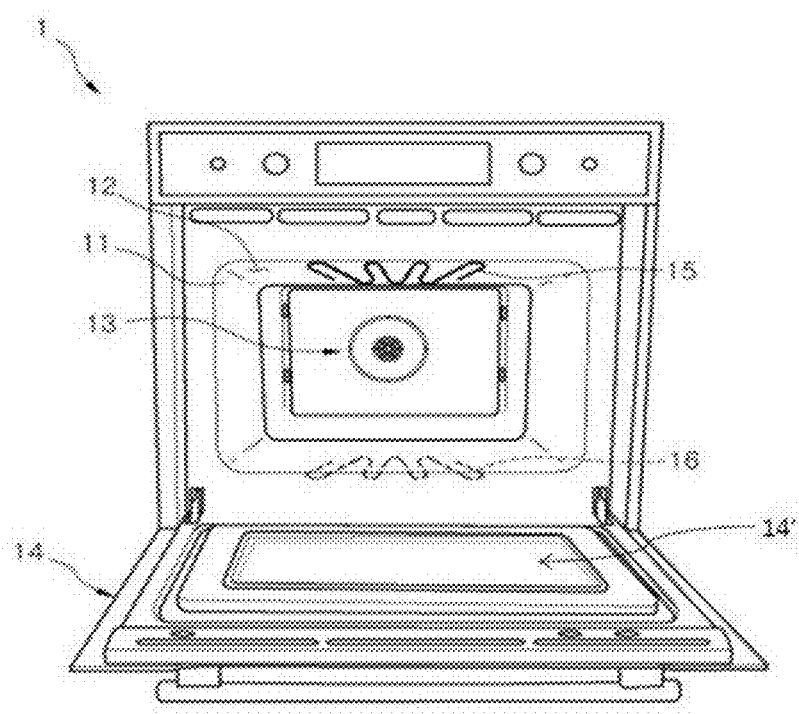
FIG. 1 is a front view showing a cooking apparatus according to an embodiment.

A glass coating composition according to embodiments may ensure 80% or greater of light transmittance in the visible light region and improve a haze property (e.g., by reducing a haze measurement value) as a result of addition of nanopowder to have light transmittance and visibility as high as those of ordinary continuous glass. The glass coating composition may have at least 80% transmittance and 5% or less (e.g., less than 5%) haze, and when applied to a door of an oven, may facilitate cleaning as well as a high light transmittance and visibility.

The glass coating composition according to embodiments may include 90 to 99 weight percent (wt %) of a glass composition, and 1 to 10 wt % of a nanopowder added to the glass composition. The glass composition may include 20 to 40 wt % of phosphorus pentoxide ($P_2O_5$), a total of 15 to 30 wt % of aluminum oxide ($Al_2O_3$) and zirconium dioxide ($ZrO_2$), a total of 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO). The glass composition may further include 1 to 10 wt % of one or more of lithium oxide ($Li_2O$), barium oxide (BaO), and calcium oxide (CaO).

The nanopowder may include one or more of zinc oxide (ZnO), titanium dioxide ($TiO_2$), tin oxide ($SnO_2$), and indium tin oxide (ITO). The nanopowder may have an average particle size of 100 nm or less, for example. ZnO may be solely added as the nanopowder, and, for example, nanopowder content may account for 4 to 6 wt % of an entire weight of the glass coating composition.

A role and content of each component of the glass coating composition according to embodiments are described hereunder. $P_2O_5$ may form a glass structure. $P_2O_5$ may be a glass former that facilitates addition of a large amount of transition metal oxides into a glass composition, and facilitates permeation of water between a surface of a coating and a contaminant so that the contaminant may be easily removed. $P_2O_5$ may also improve light transmittance of the coating.

$P_2O_5$ content may account for 20 to 40 wt % of the entire weight of the glass composition according to embodiments disclosed herein, for example. When more than 40 wt % of $P_2O_5$ is added, the glass composition may be hardly glazed and thermophysical properties of the glass composition may be impaired. When less than 20 wt % of $P_2O_5$ is added, light transmittance and cleaning performance of the coating may be degraded.

$Al_2O_3$ and $ZrO_2$ may enhance durability of phosphate-based glass and improve surface hardness of the coating formed from the glass composition. A total content of $Al_2O_3$ and $ZrO_2$ may account for 15 to 30 wt % of the entire weight of the glass composition according to embodiments disclosed herein. When a total of $Al_2O_3$ and $ZrO_2$ is than 30 wt %, adhesion and light transmittance of the coating may decrease. When the total of $Al_2O_3$ and $ZrO_2$ is less than 15 wt %, physical and chemical durability of the coating may decrease.

As an example of embodiments disclosed herein, $Al_2O_3$ content may be larger than $ZrO_2$ content. When 18 to 20 wt % of $Al_2O_3$ is added and 0.5 to 3 wt % of $ZrO_2$ is added, the coating may have a highest or very high light transmittance and durability. When 0.5 to 3 wt % of $ZrO_2$ is added, excellent physical and chemical durability of the coating may be maintained while transmittance of the coating may not be degraded.

$Na_2O$ and $K_2O$ may decrease a firing temperature of the coating composition while improving cleaning performance. A total content of $Na_2O$ and $K_2O$ may account for 10 to 30 wt % of the entire weight of the glass composition, for example. When a total of greater than 30 wt % of $Na_2O$ and $K_2O$ is added, a firing temperature of the glass composition may not decrease, and coating performance may be deteriorated. When a total of less than 10 wt % of $Na_2O$ and $K_2O$ is added, cleaning performance may be deteriorated. $Na_2O$ content may be larger than $K_2O$ content, for example. When 10 to 20 wt % of $Na_2O$ is added and 5 to 10 wt % of $K_2O$ is added, cleaning performance may be excellent, and low-temperature firing may be possible.

$B_2O_3$ may be a glass former to help each component of the coating composition to melt uniformly. $B_2O_3$ also enhances physical and thermochemical durability of the coating. $B_2O_3$ content may account for 10 to 25 wt % of the entire weight of the glass composition, for example. When greater than 25 wt % of $B_2O_3$ is added, addition of other components may be interfered with, cleaning performance may be deteriorated, and a light transmittance may be impaired. When less than 10 wt % of $B_2O_3$ is added, the glass composition may be more likely to collapse, and crystallization of glass may occur.

ZnO may enhance light transmittance of the coating composition. ZnO content may account for 10 to 15 wt % of the entire weight of the glass composition, for example. The glass composition may include a larger amount of ZnO than a coating composition of the related art to maximize or increase light transmittance of the coating. The other components of the coating composition may be adjusted in their compositions, except for ZnO, to maximize or increase light transmittance and ensure an excellent cleaning performance and durability. When less than 10 wt % of ZnO is included, a light transmittance may be impaired. When greater than 15 wt % of ZnO is included, addition of other components may be interfered with, and cleaning performance and durability of the coating may be impaired.

When ZnO content excessively increases among the components of the glass composition, a thermal expansion coefficient of the coating may increase, and the coating may have cracks. Due to a chemical unbalance caused by the increase in the ZnO content, a coating layer may melt in an acidic solution or an alkaline solution and may leave a mark. To solve this problem, an optimal or predetermined amount of $ZrO_2$ may be included in the glass composition. $ZrO_2$ may cause or facilitate crystallization of glass. The glass composition may include an optimal or predetermined amount of $ZrO_2$ such that the coating layer leaves no mark although it melts in an acidic solution or an alkaline solution.

The glass composition may further include 1 to 10 wt % of one or more of lithium oxide ($Li_2O$), barium oxide (BaO), and calcium oxide (CaO). One or more of $Li_2O$, BaO, and CaO may control thermophysical properties, such as a thermal expansion coefficient, thermal resistance, and firing temperature of the coating. When less than 1 wt % of one or more of $Li_2O$, BaO and CaO is added, thermophysical properties may not be controlled. When greater than 10 wt % of one or more of $Li_2O$, BaO, and CaO is added, addition of other components may be interfered with, and a light transmittance may be impaired.

The nanopowder may be a core component to control haze and improve light transmittance. The powder form may be added to the glass composition to improve a haze property while maintaining thermophysical properties, cleaning performance, and light transmittance. The nanopowder may be added to the glass composition when a paste-type glass coating composition is manufactured.

The nanopowder may include one or more of ZnO, $TiO_2$, $SnO_2$, and ITO. As an example, just or only ZnO may be used as the nanopowder. The nanopowder may have an average particle size of 100 nm or less, for example. When the average particle size of the nanopowder is greater than 100 nm, a large particle size may degrade a haze property (or increase hazing).

Nanopowder content may account for 1 to 10 wt %, for example, 4 to 6 wt %, of the entire weight of the glass coating composition. When less than 1 wt % of the nanopowder is added, benefits of the addition of the nanopowder may not be clearly revealed, and a high visibility may not be ensured. When greater than 10 wt % of the nanopowder is added, addition of other components may be interfered with, and cleaning performance and durability of the coating may be impaired, which may further increase hazing. ZnO may be solely added as the nanopowder, and ZnO content may account for 4 to 6 wt % of the entire weight of the glass coating composition, for example.

With the above-described novel composition ratio, the glass coating composition according to embodiments may ensure a high light transmittance and a high visibility when coated and applied onto a door of an oven. The glass coating composition may have a thermophysical property of being fired or burned at 700° C. or lower, and when coated and applied onto a door of an oven, may ensure sufficient cleaning performance to remove contaminants which have been fixed or adhered to the oven by heat as a result of use, and cleaning may be done by simply using a wet kitchen scrubber without an additional detergent.

A manufacturing method for coated glass according to embodiments may include preparing a base material including glass, applying a glass coating composition onto the base material, firing the base material and the coating composition and forming a coating layer, and cooling the base material where the coating layer is formed. The glass coating composition may include 90 to 99 wt % of a glass composition, and 1 to 10 wt % of nanopowder added to the glass composition.

The glass composition may include 20 to 40 wt % of phosphorus pentoxide ($P_2O_5$), a total of 15 to 30 wt % of aluminum oxide ($Al_2O_3$) and zirconium dioxide ($ZrO_2$), a total of 10 to 30 wt % of sodium oxide ($Na_2O$) and potassium oxide ($K_2O$), 10 to 25 wt % of boron trioxide ($B_2O_3$), 10 to 15 wt % of zinc oxide (ZnO), and 1 to 10 wt % of one or more of lithium oxide ($Li_2O$), barium oxide (BaO), and calcium oxide (CaO).

In a firing step according to embodiments, firing or heating may be performed at 600 to 700° C. within 5 minutes, for example. The glass composition may further include 1 to 10 wt % of one or more of lithium oxide ($Li_2O$), barium oxide (BaO), and calcium oxide (CaO).

The nanopowder may include one or more of zinc oxide (ZnO), titanium dioxide ($TiO_2$), tin oxide ($SnO_2$), and indium tin oxide (ITO). The nanopowder may have an average particle size of 100 nm or less, for example. ZnO may be solely added as the nanopowder, and, for example, nanopowder content may account for 4 to 6 wt % of the entire weight of the glass coating composition.

Tempered glass may be used as a base material to be applied to home appliances such as a cooking apparatus. The glass coating composition according to embodiments may have a thermophysical property of being fired at 700° C. or less, as described above. The base material and the glass coating composition may be thermally processed at 700° C. or less within 5 minutes to perform tempering of the base material and firing of the glass coating composition at the same time. Coated glass manufactured using such a method may have or ensure light transmittance of 80% or greater in the visible light region and haze of less than 5%.

Figure 2:
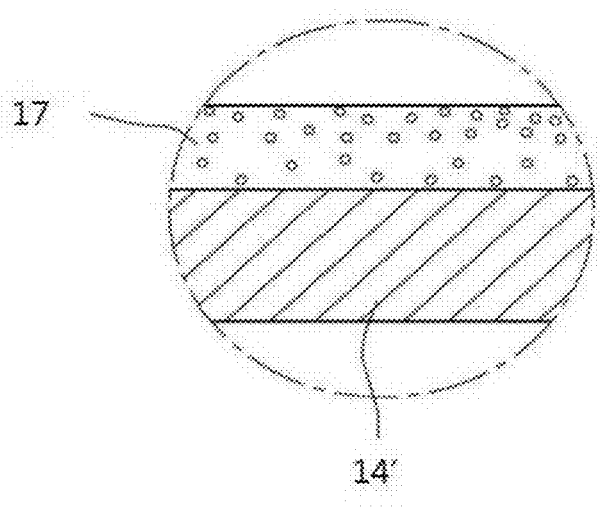
FIG. 2 is an enlarged cross-sectional view showing a part of an inner surface of the door glass in FIG. 1.

Referring to FIG. 1 and FIG. 2, a cooking apparatus 1 according to an embodiment may include a cavity 11 where a cooking space is formed, and a door 14 configured to open and/or close the cooking space. The door 14 may include a door glass or window 14' that has a coating layer 17 on a surface thereof, and the coating layer 17 may be formed using the above-described glass coating composition.

At least one heat source 13, 15, 16 may be configured to provide heat to heat an object or food in the cooking space. The cavity 11 may be formed in a hexahedron shape, the front of which is open. The at least one heat source 13, 15, 16 may include a convection assembly 13 to discharge heated air into the cavity 11, an upper heater 15 provided in an upper portion of the cavity 11, and a lower heater 16 provided in a lower portion of the cavity 11.

The upper heater 15 and the lower heater 16 may be provided inside or outside the cavity 11. The at least one heat source 13, 15, 16 may not necessarily include the convention assembly 13, the upper heater 15, and the lower heater 16. The at least one heat source 13, 15, 16 may include one or more of the convention assembly 13, the upper heater 15, and/or the lower heater 16. The glass coating composition according to embodiments may be coated and dried on a surface of the door glass 14' so that a coating later 17 may be formed on the surface of the door glass 14'. When the coating layer 17 prepared according to embodiments disclosed herein is applied to the door glass 14', the door glass may have a light transmittance of at least 80% and a haze of less than 5%.

Configurations and operations according to the embodiments are described. However, the embodiments are provided as examples and should not be construed as limiting embodiments in any aspect. Details which are not stated herein but may be technically inferred by one skilled in the art will be omitted.

1. Manufacturing of Coated Glass

Embodiments 1 to 7

A glass composition material in accordance with the composition ratios in Table 1 was prepared. In this case, ammonium dihydrogen phosphate ($NH_4H_2PO_4$) was used as a raw material for phosphorus pentoxide ($P_2O_5$), and sodium carbonate ($Na_2CO_3$), potassium carbonate ($K_2CO_3$), and lithium carbonate ($Li_2CO_3$) were respectively used as raw materials for sodium oxide ($Na_2O$), potassium oxide ($K_2O$), and lithium oxide ($Li_2O$). Additionally, barium carbonate ($BaCO_3$) and calcium carbonate ($CaCO_3$) were respectively used as raw materials for barium oxide (BaO) and calcium oxide (CaO). The remaining raw materials used were the same as the remaining listed components in Table 1.

The glass composition material in accordance with the composition ratios in Table 1 was melted at 1,300° C. for 30 minutes and then quenched. Additionally, the quenched material was ground to have a D50 value or median diameter of less than 10 μm.

Then, the ground glass composition material and ethyl cellulose were mixed, and then nanopowder was added to the glass composition material in accordance with the composition ratios in Table 2 and was uniformized using a three-roll mill. Then, a paste-type glass coating composition was manufactured. Then, the glass coating composition was applied onto soda lime glass having a width of 35 mm, a height of 35 mm, and a thickness of 5 mm, and then was thermally processed at 700° C. for five minutes to manufacture coated glass.

In Comparative Example 1, soda lime glass having a width of 35 mm, a height of 35 mm, and a thickness of 5 mm was prepared.

In Comparative Example 2, coated glass was manufactured using the same method as that of Embodiment 1, except that the nanopowder was not added.

TABLE 1

(Unit: wt %)

| Component | Embodiment 1 | Embodiment 2 | Embodiment 3 | Embodiment 4 | Embodiment 5 | Embodiment 6 | Embodiment 7 | Comparative Example 2 |
|---|---|---|---|---|---|---|---|---|
| $P_2O_5$ | 31 | 30 | 32 | 33 | 32 | 31 | 32 | 31 |
| $Al_2O_3$ | 18 | 19 | 17.5 | 18 | 19 | 18 | 19 | 18 |
| $ZrO_2$ | 2.5 | 2.0 | 2.5 | 2.0 | 2.0 | 2.0 | 2.0 | 2.5 |
| $Na_2O$ | 16 | 15 | 15 | 14 | 14 | 15 | 14 | 16 |
| $K_2O$ | 7 | 8 | 7 | 9 | 8 | 8 | 7 | 7 |
| $B_2O_3$ | 13 | 12 | 12 | 11 | 12 | 11 | 11 | 13 |
| ZnO | 11 | 12 | 11 | 12 | 11 | 13 | 12 | 11 |
| $Li_2O$ | — | 0.5 | 1.0 | 0.5 | 0.5 | 1.5 | 2.0 | — |
| BaO | 1.0 | 1.0 | 1.0 | 0.5 | 1.0 | — | 0.5 | 1.0 |
| CaO | 0.5 | 0.5 | 1.0 | — | 0.5 | 0.5 | 0.5 | 0.5 |
| Total | 100 | 100 | 100 | 100 | 100 | 100 | 100 | 100 |

TABLE 2

| Category | Glass composition (wt %) | Nanopowder (wt %) | Average particle size of nanopowder (nm) | Thickness of coating layer (μm) |
|---|---|---|---|---|
| Embodiment 1 | 95 | 5 (TiO$_2$) | 75 | 12 |
| Embodiment 2 | 95 | 5 (SnO$_2$) | 80 | 12 |
| Embodiment 3 | 95 | 5 (ITO) | 95 | 12 |
| Embodiment 4 | 97 | 3 (ZnO) | 90 | 11 |
| Embodiment 5 | 95 | 5 (ZnO) | 85 | 9 |
| Embodiment 6 | 93 | 7 (ZnO) | 90 | 10 |
| Embodiment 7 | 90 | 10 (ZnO) | 85 | 10 |
| Comparative Example 2 | 100 | — | — | 10 |

2. Evaluation of Optical Property

Table 3 shows results of evaluation of optical properties of Embodiments 1 to 7 and Comparative Examples 1 to 2. FIG. 3 shows values of physical properties of coated glass manufactured according to Embodiments 1 to 3 and Comparative Examples 1 to 2, and FIG. 4 shows values of physical properties of coated glass manufactured according to embodiments 4 to 7.

1) Light Transmittance

In relation to light transmittance, a UV visible measuring instrument was used to measure light transmittance in the visible light region having a wavelength range of 380 to 780 nm.

2) Haze

Haze was measured with a haze meter (model No. NDH-500) of Nippon Denshoku Industries by applying formula 1. Herein, haze denotes an average of haze values measured 5 times excluding a highest value and a lowest value.

Haze=(Diffuse transmittance/Total transmittance)×100     Formula 1

TABLE 3

| Category | Haze (%) | Light transmittance (%) | Total transmittance (%) | Parallel transmittance (%) | Diffuse transmittance (%) |
|---|---|---|---|---|---|
| Embodiment 1 | 41.26 | 50.4 | 74.78 | 43.93 | 30.85 |
| Embodiment 2 | 21.84 | 75.3 | 82.21 | 64.27 | 17.95 |
| Embodiment 3 | 24.50 | 68.3 | 83.12 | 62.75 | 20.36 |
| Embodiment 4 | 16.18 | 80.1 | 85.96 | 72.05 | 13.91 |
| Embodiment 5 | 4.14 | 85.2 | 89.72 | 86.01 | 3.71 |
| Embodiment 6 | 36.36 | 67.8 | 80.68 | 51.34 | 29.34 |
| Embodiment 7 | 45.15 | 72.8 | 79.85 | 43.80 | 36.05 |
| Comparative Example 1 | 0.81 | 91.0 | 91.29 | 90.55 | 0.74 |
| Comparative Example 2 | 21.30 | 71.9 | 82.01 | 64.63 | 17.38 |

As shown in Tables 1 to 3 and FIGS. 3 to 4, the coated glass manufactured according to Embodiments 4 to 5 had a lower haze value and a higher light transmittance than the coated glass manufactured according to Embodiments 1 to 3 and 6 to 7.

The coated glass manufactured according to Embodiments 4 to 5 had improved light transmittance and clarity or haze value unlike the coated glass manufactured according to Comparative Example 2. As shown in FIG. 4, characters are seen clearly and obviously with the naked eye. Embodiment 5 had optical property levels almost similar to those of comparative example 1. Embodiment 5, where 3 wt % of ZnO was solely added as the nanopowder, had light transmittance of 85.2% and haze of 4.14%.

Figure 5:
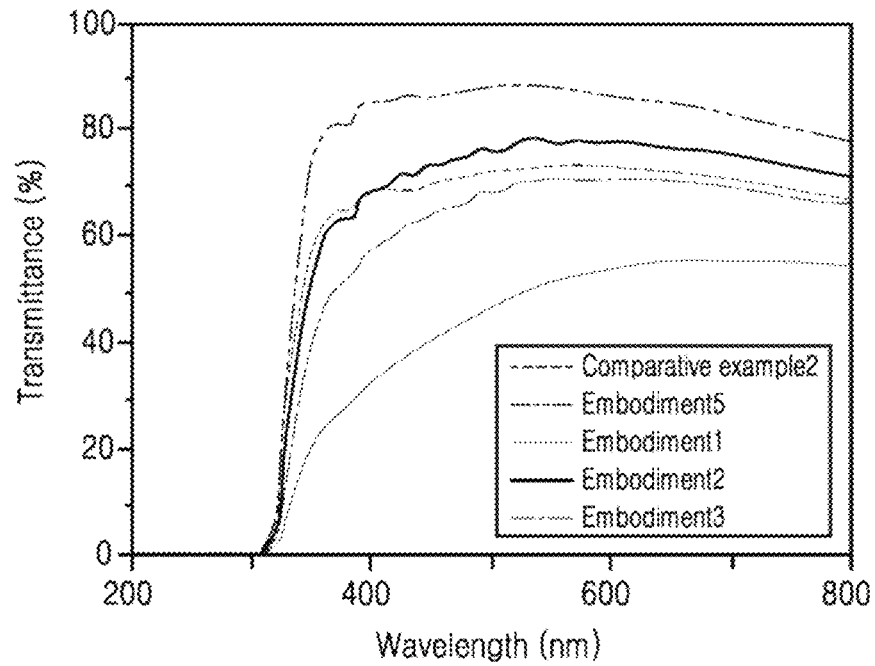
FIG. 5 shows a graph of results of measurement of transmittance of coated glass manufactured according to embodiments 1 to 3 and embodiment 5, and comparative example 2.
Figure 6:
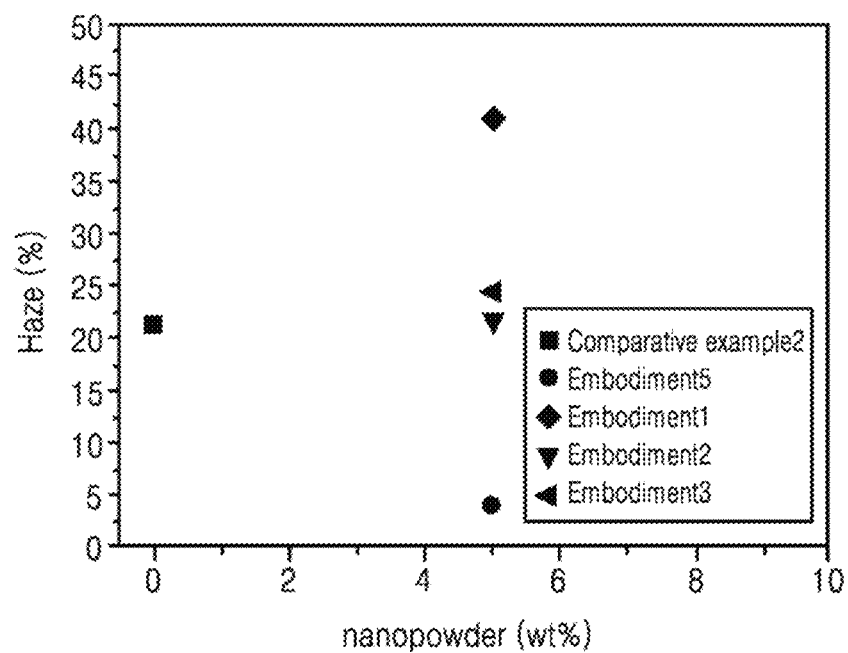
FIG. 6 shows a graph of results of measurement of haze of coated glass manufactured according to embodiments 1 to 3 and embodiment 5, and comparative example 2.

FIG. 5 shows a graph of transmittance measurement results of coated glass manufactured according to Embodiments 1 to 3 and 5 and Comparative Example 2, and FIG. 6 shows a graph of haze measurement results of coated glass manufactured according to Embodiments 1 to 3 and 5 and Comparative Example 2. As shown in FIGS. 5-6, the coated glass manufactured according to Embodiment 5 had a lower haze value and a higher light transmittance than the coated glass manufactured according to Embodiments 1 to 3 and Comparative example 2.

Figure 7:
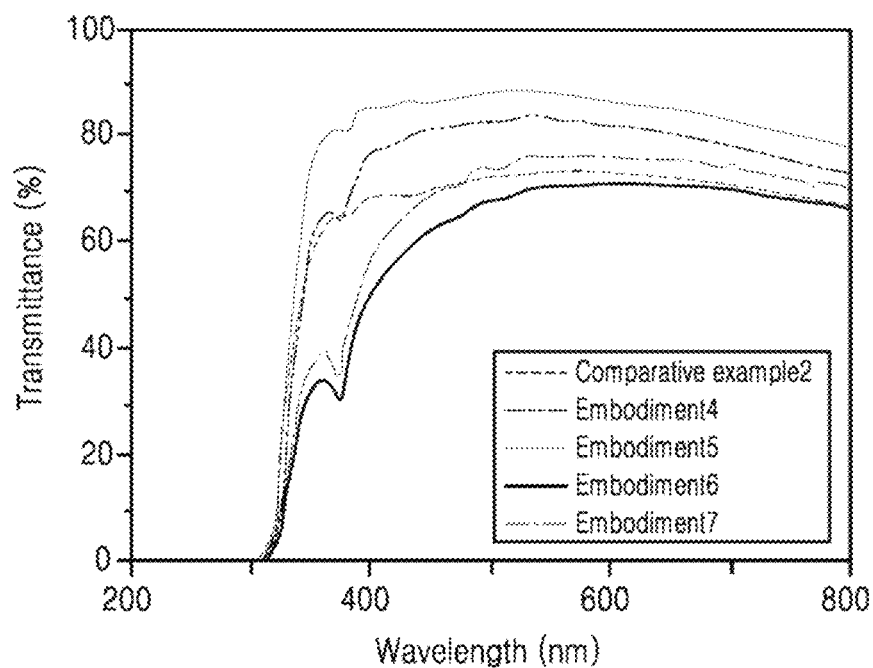
FIG. 7 shows a graph of results of measurement of transmittance of coated glass manufactured according to embodiments 4 to 7 and comparative example 2.
Figure 8:
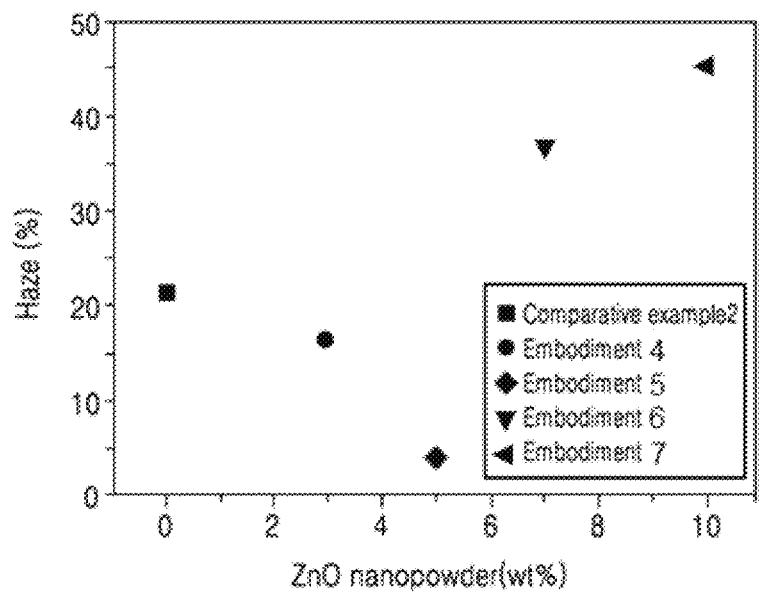
FIG. 8 shows a graph of results of measurement of haze of coated glass manufactured according to embodiments 4 to 7 and comparative example 2.

FIG. 7 shows a graph of transmittance measurement results of coated glass manufactured according to Embodiments 4 to 7 and Comparative example 2, and FIG. 8 shows a graph of haze measurement results of coated glass manufactured according to Embodiments 4 to 7 and Comparative Example 2. As shown in FIG. 7 and FIG. 8, Embodiments 4 to 5, in which 3 wt % and 5 wt % of ZnO was respectively added as the nanopowder, had a higher light transmittance and a lower haze value than Embodiments 6 to 7, in which 7 wt % and 10 wt % of ZnO, was respectively added as the nanopowder, and also Comparative Example 2, in which 0 wt % of ZnO was added as the nanopowder.

Embodiments disclosed herein may provide a novel glass coating composition that may have a high light transmittance and a high visibility. Embodiments disclosed herein may help to completely remove contaminants with only a wet kitchen scrubber.

Embodiments disclosed herein may provide a novel glass coating composition that may ensure 80 or greater % of light transmittance in the visible light range and improve a haze property, visibility, or clarity as a result of the addition of nanopowder to have light transmittance and visibility as high as those of ordinary continuous glass when applied to door glass or window of a cooking apparatus.

Aspects are not limited to the above, and other aspects and advantages that are not mentioned above can be clearly understood from the description and can be more clearly understood from the embodiments set forth herein. Further, the aspects and advantages may be realized via means and combinations thereof in the appended claims.

Embodiments disclosed herein may provide a glass coating composition to ensure at least 80% of light transmittance in the visible light region and improve a haze property or visibility as a result of addition of nanopowder to have light transmittance and visibility as high as those of ordinary continuous glass. The glass coating composition may have at least 80% of transmittance and less than 5% of haze, and when applied to a door of an oven, may ensure an excellent cleaning performance as well as a high light transmittance and visibility.

The glass coating composition according to embodiments may include 90 to 99 wt % of a glass composition, and 1 to 10 wt % of nanopowder added to the glass composition. The glass composition may include 20 to 40 wt % of phosphorus pentoxide ($P_2O_5$), a total of 15 to 30 wt % of aluminum oxide ($Al_2O_3$) and zirconium dioxide ($ZrO_2$), a total of 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO). The glass composition may further include 1 to 10 wt % of one or more of lithium oxide ($Li_2O$), barium oxide (BaO), and calcium oxide (CaO).

The nanopowder may include one or more of zinc oxide (ZnO), titanium dioxide ($TiO_2$), tin oxide ($SnO_2$), and indium tin oxide (ITO). The nanopowder may have an average particle size of 100 nm or less, for example. ZnO may be solely added as the nanopowder, and for example, nanopowder content may account for 4 to 6 wt % of an entire weight of the glass coating composition.

In a cooking apparatus to which the glass coating composition according to embodiments is applied, a user may look inside a door or window of the cooking apparatus clearly and obviously with the naked eye. A glass coating composition according to embodiments disclosed herein may have a novel composition ratio, and when coated and applied onto a door of an oven, may ensure a high light transmittance and a high visibility. A cooking apparatus to which the glass coating composition is applied may allow a user to look inside a door of the cooking apparatus clearly and obviously with the naked eye.

The glass coating composition according to embodiments disclosed herein may have a thermophysical property of being burned or fired at 700° C. or lower, and when coated and applied onto a door of an oven, may help to remove contaminants, fixed by heat as a result of use of the oven, using a wet kitchen scrubber without an additional detergent, and may ensure an excellent cleaning performance.

The above-described aspects, features and advantages are specifically described with reference to the accompanying drawings such that one having ordinary skill in the art to which the present disclosure pertains can easily implement the technical spirit in the disclosure. In the disclosure, detailed description of known technologies in relation to the disclosure is omitted if it is deemed to make the gist of the disclosure unnecessarily vague. Embodiments according to the disclosure are specifically described with reference to the drawings. Throughout the disclosure, identical reference numerals may denote identical or similar components.

In the disclosure, the singular forms "a", "an" and "the" are intended to include the plural forms as well, unless explicitly indicated otherwise. It should be further understood that the terms "comprise" or "have" and the like set forth herein are not interpreted as necessarily including all the stated components or steps but can be interpreted as including some of the stated components or steps or as further including additional components or steps.

Although the embodiments are described with reference to a number of illustrative embodiments thereof, it is apparent that the present disclosure is not intended to limit the embodiments and drawings set forth herein and that numerous other modifications and embodiments can be devised by one skilled in the art that will fall within the spirit and scope of the principles of this disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glass coating composition, comprising:
   90 to 99 weight percent (wt %) of a glass composition; and
   1 to 10 wt % of a nanopowder added to the glass composition, wherein the glass composition comprises:
   20 to 40 wt % of phosphorus pentoxide ($P_2O_5$), a total of 15 to 30 wt % of aluminum oxide ($Al_2O_3$) and zirconium dioxide ($ZrO_2$), a total of 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO), wherein the nanopowder comprises at least one of zinc oxide (ZnO), titanium dioxide ($TiO_2$), tin oxide ($SnO_2$), or indium tin oxide (ITO).

2. The glass coating composition of claim 1, wherein the glass composition further comprises a total of 1 to 10 wt % of at least one of lithium oxide ($Li_2O$), barium oxide (BaO), or calcium oxide (CaO).

3. The glass coating composition of claim 1, wherein only ZnO is added as the nanopowder, and the nanopowder content accounts for 4 to 6 wt % of an entire weight of the glass coating composition.

4. The glass coating composition of claim 1, wherein an amount of $Al_2O_3$ in the glass composition is greater than an amount of $ZrO_2$ in the glass composition.

5. The glass coating composition of claim 1, wherein an amount of $Na_2O$ in the glass composition is greater than an amount of $K_2O$ in the glass composition.

6. The glass coating composition of claim 1, wherein the nanopowder has an average particle size of 100 nm or less.

7. A cooking appliance including a glass panel having a coating layer formed using the glass coating composition of claim 1, the glass panel allowing a user to view inside of the cooking appliance via the glass panel.

8. A cooking apparatus, comprising:
   a cavity forming a cooking space therein; and
   a door configured to open or close the cooking space, the door including a window having a coating layer provided on a surface of the window, wherein the coating layer is formed using the glass coating composition of claim 1.

9. The cooking apparatus of claim 8, wherein, the window provided with the coating layer has a visible light transmittance of at least 80% and a haze of less than 5%.

* * * * *